Oct. 9, 1956     T. O. SMITH ET AL     2,765,725
LAWN EDGER
Filed April 24, 1953
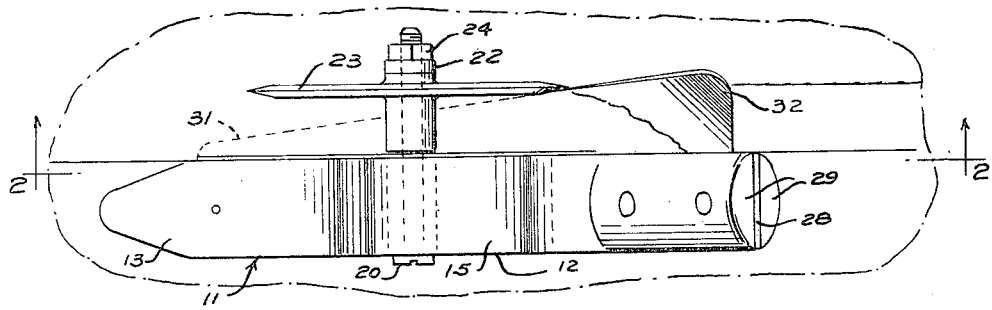
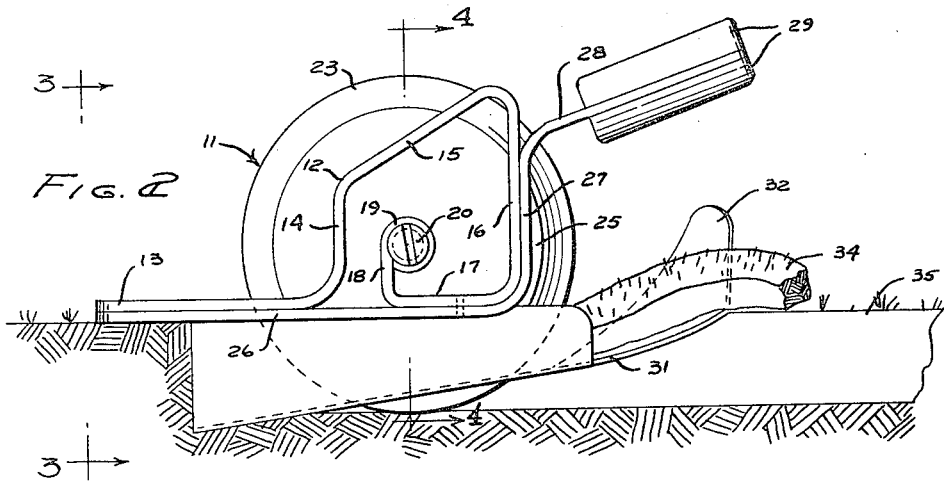
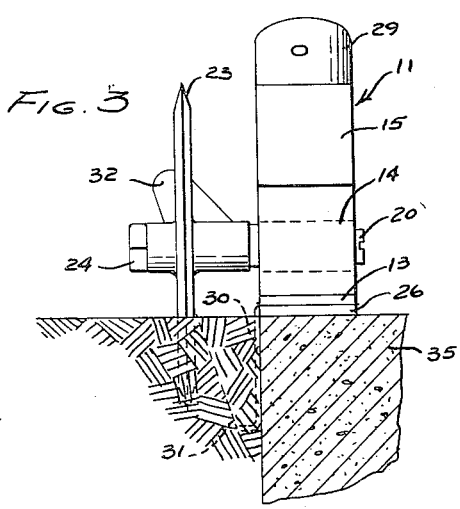
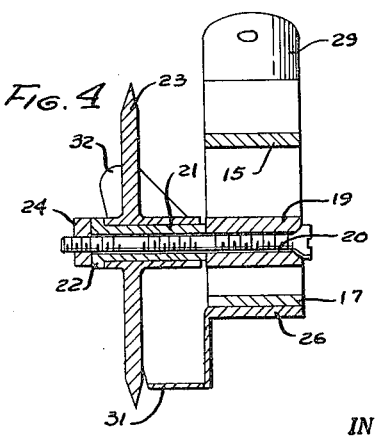
INVENTOR.
WILLIAM C. SMITH
BY THOMAS O. SMITH
McMorrow, Berman & Davidson
ATTORNEYS United States Patent Office 2,765,725
Patented Oct. 9, 1956

2,765,725

LAWN EDGER

Thomas O. Smith, Pauls Valley, Okla., and William C. Smith, Abilene, Tex.; George B. Smith, administrator of said William C. Smith, deceased Application April 24, 1953, Serial No. 350,820

3 Claims. (Cl. 97—227)

This invention relates to sod trimming devices for lawns, and more particularly to an improved lawn edger.

The main object of the invention is to provide a novel and improved lawn edging tool which is simple in construction, which is easy to manipulate, and which provides a neatly trimmed appearance at the edge of a lawn adjacent to a structure such as a walk, a pavement, or the like.

A further object of the invention is to provide an improved lawn edging tool which is inexpensive to manufacture, which is sturdy in construction, which is easy to operate, and which is arranged to cut a groove at the edge of a lawn area adjacent to a pavement, curb, walk, or the like, and to throw the cut sod upwardly and rearwardly over the pavement as the tool progresses therealong.

Further objects and advantages of the invention will become apparent from the following description and claims, and from the accompanying drawings, wherein:

Figure 1 is a top plan view of an improved lawn edging tool constructed in accordance with the present invention.

Figure 2 is a vertical cross sectional view taken on Figure 1 on the line 2—2 thereof, showing the lawn edging tool in side elevation.

Figure 3 is a transverse vertical cross sectional view taken on the line 3—3 of Figure 2, showing the lawn edging tool in front elevation.

Figure 4 is a vertical transverse cross sectional view taken through the lawn edging tool on the line 4—4 of Figure 2.

Referring to the drawings, the improved lawn edging tool is designated generally at 11 and comprises a first bracket member 12 formed of flat bar stock, as shown in Figures 1 and 2, said first bracket member being formed with the horizontal forwardly extending arm portion 13, with the first vertical portion 14 extending upwardly from the arm portion 13, with the inclined portion 15 extending upwardly and rearwardly from the vertical portion 14, with the second vertical portion 16 extending downwardly from the upper end of the inclined portion 15, with the horizontal portion 17 extending forwardly coplanar with arm portion 13, with the short upwardly extending vertical portion 18 rising from the forward end of the horizontal portion 17, and with the transverse sleeve portion 19 formed integrally with the short vertical portion 18. Designated at 20 is a transverse bolt member extending through the sleeve portion 19 and through a shouldered bushing 21, the shouldered portion of said bushing being shown at 22. Rotatably mounted on the bushing 21 is the cutter wheel 23 which is thus supported for rotation between the shoulder 22 and the adjacent end of sleeve portion 19. Threadedly engaged on the bolt member 20 is the retaining nut 24.

Designated at 25 is a second bracket member which has a horizontal flange portion 26 underlying and secured in any suitable manner to the horizontal arm portions 13 and 17 of bracket member 12. Integral with the horizontal flanged portion 26 is the vertical arm 27 rising from the rear end portion of flange 26 and formed with the upwardly and rearwardly inclined end portion 28 to which is secured the handle elements 29, 29. The vertically rising portion 27 of the second bracket member 25 may be rigidly secured in any desired manner to the adjacent vertical portion 16 of the first bracket member 12.

Designated at 30 is a depending vertical flange formed on the edge of the horizontal flange 26, as shown in Figure 3, said vertical flange 30 extending alongside of and being spaced from the cutter wheel 23. Integrally formed with the lower edge of the flange 30 is the upwardly and rearwardly inclined sod deflecting baffle element 31, said baffle element 31 being flared rearwardly in width, as shown in Figure 1, and being twisted upwardly at its rear end, as shown at 32, the twisted portion 32 being spaced rearwardly behind the cutter wheel 23 and being arranged to deflect the cut sod, shown at 34, upwardly and rearwardly over the corner of a curb or other pavement element 35 on which the implement is slidably supported, as will be presently described.

In using the device, the flange 26 is engaged on the marginal portion of the pavement, such as a curb or walk adjacent the sod to be trimmed, the flange 30 engaging against the inside vertical surface of the pavement portion 35. The tool is then moved along the pavement, being slidably supported on the top corner of the pavement portion 35, the cutter wheel 23 engaging in the sod and making a vertical cut in the sod a short distance from the inside vertical surface of the pavement portion 35, to thereby define a narrow groove between the sod and the pavement. As the implement is moved forwardly along its course of travel, the severed strip of sod 34 is deflected upwardly on the baffle element 31 and is also deflected laterally over the pavement portion 35 by the twisted rear baffle element 32, which thus deposits the severed strip of sod on the pavement portion 35, rather than allowing said severed strip to fall back into the newly cut groove.

As shown in Figure 3, the flange 30 depends to a depth slightly greater than the depth of the cutter wheel 23, whereby the severed strip of sod is cleanly removed and elevated rearwardly of the implement as it moves forwardly along its course of travel, leaving a relatively clean furrow or groove adjacent to the pavement portion 35.

While a specific embodiment of an improved lawn edging tool has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A lawn edger comprising a first bracket member consisting of a piece of flat bar stock formed to define a vertical loop having a forwardly extending horizontal bottom end portion and a horizontal rear portion aligned with said forward end portion, said rear portion having an upstanding vertical arm located within said loop and formed at its top end with a transverse horizontal sleeve element, a bolt member extending through said sleeve element, a cutter wheel journaled on said bolt member for rotation in a vertical plane, a second bracket member secured to said aligned horizontal portions, means for securing a handle to said second bracket member, said second bracket member comprising a horizontal flange underlying said aligned horizontal portions and a depending vertical flange extending alongside said cutter wheel, defining a right-angled corner with said horizontal flange to receive the corner edge of a pavement, whereby the edger may be slidably supported on the top edge of the pavement adjacent the lawn with said cutter wheel engaged in the lawn, and an upwardly and rearwardly inclined sod deflecting baffle element carried by said vertical flange, said baffle element having a laterally projecting edge and being arranged to deflect cut sod upwardly, laterally and rearwardly over the edge of the pavement.

2. A lawn edger comprising a first bracket member consisting of a piece of flat bar stock formed to define a vertical loop having a forwardly extending horizontal bottom end portion and a horizontal rear portion aligned with said forward end portion, said rear portion having an upstanding vertical arm located within said loop and formed at its top end with a transverse horizontal sleeve element, a bolt member extending through said sleeve element, a cutter wheel journaled on said bolt member for rotation in a vertical plane, a second bracket member secured to said aligned horizontal portions, means for securing a handle to said second bracket member, said second bracket member comprising a horizontal flange underlying said aligned horizontal portions and a depending vertical flange extending alongside said cutter wheel, defining a right-angled corner with said horizontal flange to receive the corner edge of a pavement, whereby the edger may be slidably supported on the top edge of the pavement adjacent the lawn with said cutter wheel engaged in the lawn, and an upwardly and rearwardly inclined sod deflecting element having a laterally projecting edge, said sod deflecting element being secured to said depending flange and extending rearwardly of the cutter wheel, said sod deflecting element having a laterally projecting edge and being arranged to deflect cut sod upwardly, laterally and rearwardly over the edge of the pavement.

3. A lawn edger comprising a first bracket member consisting of a piece of flat bar stock formed to define a vertical loop having a forwardly extending horizontal bottom end portion and a horizontal rear portion aligned with said forward end portion, said rear portion having an upstanding vertical arm located within said loop and formed at its top end with a transverse horizontal sleeve element, a bolt member extending through said sleeve element, a cutter wheel journaled on said bolt member for rotation in a vertical plane, a second bracket member secured to said aligned horizontal portions, means for securing a handle to said second bracket member, said second bracket member comprising a horizontal flange underlying said aligned horizontal portions and a depending vertical flange extending alongside said cutter wheel, defining a right-angled corner with said horizontal flange to receive the corner edge of a pavement, whereby the edger may be slidably supported on the top edge of the pavement adjacent the lawn with said cutter wheel engaged in the lawn, and an upwardly and rearwardly inclined sod deflecting flange element formed integrally with said depending flange at the bottom edge of said depending flange, said sod deflecting element having a laterally projecting edge and extending rearwardly of the cutter wheel, being flared rearwardly in width, and being twisted upwardly at its rear end to deflect cut sod over the top edge of the pavement, said sod deflecting element being arranged to deflect cut sod upwardly, laterally and rearwardly over the edge of the pavement.

References Cited in the file of this patent

UNITED STATES PATENTS

| | | |
|---|---|---|
| 620,909 | Garlach | Mar. 14, 1899 |
| 1,562,174 | Johnson | Nov. 17, 1925 |
| 1,721,661 | Hawney | July 23, 1929 |
| 1,766,212 | Bellah | June 24, 1930 |
| 1,770,434 | Schleicher | July 15, 1930 |
| 1,856,412 | D'Ippolito | May 3, 1932 |
| 2,476,461 | Smith | July 19, 1949 |
| 2,560,882 | McCauley | July 17, 1951 |